United States Patent [19]

O'Hern

[11] Patent Number: 4,570,915
[45] Date of Patent: Feb. 18, 1986

[54] WORKBENCH CONSTRUCTION

[76] Inventor: Michael J. O'Hern, 132 Cedar St., Rehoboth, Mass. 02769

[21] Appl. No.: 611,013

[22] Filed: May 14, 1984

[51] Int. Cl.⁴ ............................................. F16M 11/00
[52] U.S. Cl. .................................... 269/295; 269/296; 269/303; 182/181; 182/151
[58] Field of Search .......................... 269/303, 315–319, 269/901, 295, 296, 297, 298, 299; 211/43; 182/181, 28, 151; 108/12, 13, 91, 157, 159; 297/442; 83/468, 859, 467, 743

[56] References Cited

U.S. PATENT DOCUMENTS

| | | | |
|---|---|---|---|
| 1,855,945 | 4/1932 | Denyer | 83/459 |
| 2,502,124 | 3/1950 | Bray | 269/303 |
| 2,705,029 | 3/1955 | Zophel | 83/459 |
| 3,300,245 | 1/1967 | Rumble | 297/442 |
| 3,484,226 | 12/1969 | Golightly | 211/41 |
| 4,105,091 | 8/1978 | Mahan | 182/151 |
| 4,157,819 | 6/1979 | Meyer | 269/303 |
| 4,241,808 | 12/1980 | Middleton et al. | 182/181 |

Primary Examiner—Robert C. Watson
Attorney, Agent, or Firm—Salter & Michaelson

[57] ABSTRACT

A workbench construction is disclosed which is easily disassembled for transportation and storage and which is adapted for use in performing a variety of different saw cutting operations. The work bench includes a pair of spaced bench beams which are independently supported on legs and a plurality of spaced elongated main rails which preferably comprise wooden boards which are disposed on edge and which are detachably received in interfitting relation on the bench beams. For performing a saw cutting operation, a member which is to be cut is positioned on the upper edges of the main rails, and the desired cutting line is aligned with the spacing between a pair of adjacent main rails to provide clearance for the saw blade. For performing other types of saw cutting operations, a plurality of spaced transverse rails are assembled in detachable interfitting relation on the main rails, and for performing precision cutting operations, a fence, a cutoff table and a mitering gauge are assembled on the transverse rails.

4 Claims, 3 Drawing Figures

WORKBENCH CONSTRUCTION

BACKGROUND AND SUMMARY OF THE INVENTION

The instant invention relates to workbenches and more particularly to a novel workbench construction which is particularly effective for performing saw cutting operations and which is adapted to be easily disassembled for transportation and storage.

While a variety of different workbench constructions have been heretofore available, most of the known workbenches have been less than completely effective for meeting the needs of carpenters and other tradesmen. For one thing, most of the heretofore-known workbench constructions have had substantially flat bench tops; and in order to perform saw cutting operations using a workbench of this type, a member which is to be cut, such as a board or a sheet of paneling, must be positioned on the bench top of the work bench so that the desired cutting line is disposed outwardly from an edge or end of the workbench so that the bench top itself is not cut by a saw blade during the cutting operation. While this procedure can be effectively used for cutting operations wherein relatively small end sections of material are cut from members so that it is unnecessary to provide independent support for the end sections as they are removed, this procedure is unsatisfactory for many other types of cutting operations. Specifically, when a large section of material is removed from a member during a cutting operation, it is frequently necessary to provide independent support for the section of material during the cutting operation in order to prevent the member from splitting or cracking in the area of the cutting line and also in order to prevent the saw blade used in the cutting operation from binding. For these reasons, when saw cutting operations have been performed using conventional workbenches, it has frequently been necessary to provide independent support for the otherwise unsupported end sections of members using saw horses or the like. Another disadvantage of most of the heretofore-known workbench constructions is that they have generally only been adapted for relatively permanent installations, and they have not been readily transportable to different job sites or adapted to be easily disassembled for transportation or storage. As a result, many carpenters and other tradesmen have constructed "make-shift" workbenches at job sites instead of using preconstructed workbenches.

While a variety of different workbench constructions have been heretofore available, none of the known workbench constructions teach or suggest a workbench having the novel features provided by the workbench construction of the instant invention. In this regard, workbenches representing the closest prior art to the instant invention of which the applicant is aware are disclosed in the U.S. Pat. Nos. to Swanson 1,112,729; Swanson 1,266,173; Miller 2,682,899; Trautmann 2,981,577; and Trautmann et al. 3,082,712. Of these references, the U.S. patent to Miller is believed to be the most important. However, even this reference does not teach a workbench construction wherein various members are detachably received in interfitting relation to permit simple and easy disassembly of the workbench for transportation and storage, and it also does not teach a workbench construction which includes many of the specific features of the workbench construction of the instant invention. For these reasons, Miller is believed to be of only general interest, and the other references which are believed to be less pertinent are also believed to be of only general interest.

The instant invention provides a novel workbench construction which overcomes many of the disadvantages of the heretofore-known workbenches. In this regard, the workbench construction of the instant invention comprises a pair of spaced, substantially parallel bench beams. A plurality of spaced longitudinally extending main rails are detachably received in interfitting relation on the bench beams so that the bench beams are positioned in substantially transverse relation to the main rails, wherein the upper surfaces of the main rails are substantially coplanar and are upwardly spaced from the bench beams. A plurality of legs are also attached to the bench beams for supporting the bench beams and the main rails on a supporting surface so that the upper surfaces of the main rails are substantially horizontal.

In the preferred embodiment of the workbench construction, the bench beams and the main rails are disposed on edge, the upper edges of the bench beams having upwardly facing notches therein, and the lower edges of the main rails having downwardly facing notches therein. The main rails are received on the bench beams with the notches in the main rails received in interfitting relation in the notches in the bench beams so that the longitudinal and transverse positions of the main rails relative to the bench beams are detachably fixed. One embodiment of the workbench construction further comprises a plurality of substantially parallel spaced transverse rails which are received in interfitting relation on the main rails, so that the upper surfaces of the transverse rails are substantially coplanar and upwardly spaced from the main rails. Preferably the transverse rails are also positioned on edge and have downwardly facing notches in the lower edges thereof which are received in interfitting relation on the main rails. This embodiment of the workbench construction preferably further comprises an elongated longitudinally extending fence member which is received in interfitting relation in upwardly facing notches formed in the transverse rails, so that the fence member is maintained in a substantially longitudinally extending disposition on the workbench, an elongated longitudinally extending cutoff table being positioned on the transverse rails adjacent the fence. A mitering gauge is preferably mounted on the fence, the mitering gauge being positionable so that it extends outwardly over the cutting table to enable angular cuts to be made on members positioned on the cutting table.

During use and operation of the workbench of the instant invention, elongated longitudinal cuts are performed on a piece of sheet stock, such as a large piece of plywood, sheet rock or other sheet material, by removing the transverse rail, the fence and the cutting table from the bench and positioning the piece of sheet stock on the upper edges of the main rails. The desired cutting line on the piece of sheet stock is then aligned with the open area between a pair of adjacent main rails to provide clearance for the saw blade used in the cutting operation. Transverse cuts are performed on a piece of sheet stock or on another type of member by positioning the transverse rails in interfitting relation on the main rails and then positioning the member which is to be cut so that it rests on the upper edges of the transverse rails with the desired cutting line aligned with the open area between a pair of adjacent transverse rails to provide clearance for the saw blade. In either of these cases, both portions of the members which are cut are fully supported on the workbench so that other types of independent support means are unnecessary. For use of the workbench for performing precision cutting operations, the fence and the cutoff table are positioned on the transverse rails, and the member which is to be cut is placed on the cutoff table. The mitering gauge is used to perform necessary angular measurements on the member, and a stop member is provided on the cutoff table and is fixed in a desired position when it is necessary to perform a series of cutting operations to cut a plurality of members to the same length. Further, while the workbench construction of the instant invention can be used to effectively perform the various specific saw cutting operations herein described, it can also effectively be used to perform drilling operations, as well as a variety of other types of operations; and since the various elements of the work bench are detachably interfitted, the work bench can be easily disassembled for transportation to different job sites and for storage.

Accordingly, it is a primary object of the instant invention to provide an effective workbench construction which can be readily and easily disassembled for transportation and storage.

Another object of the instant invention is to provide a workbench construction wherein clearance is provided for a saw blade during use of the workbench for performing a saw cutting operation.

A further object of the instant invention is to provide an effective workbench construction wherein clearance is alternatively provided for a saw blade during the performance of longitudinal or transverse saw cutting operations.

A still further object of the instant invention is to provide an easily disassembled workbench construction which includes a plurality of spaced, longitudinally extending main rails, a plurality of spaced transverse rails, a fence member, a cutoff table and a mitering gauge.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
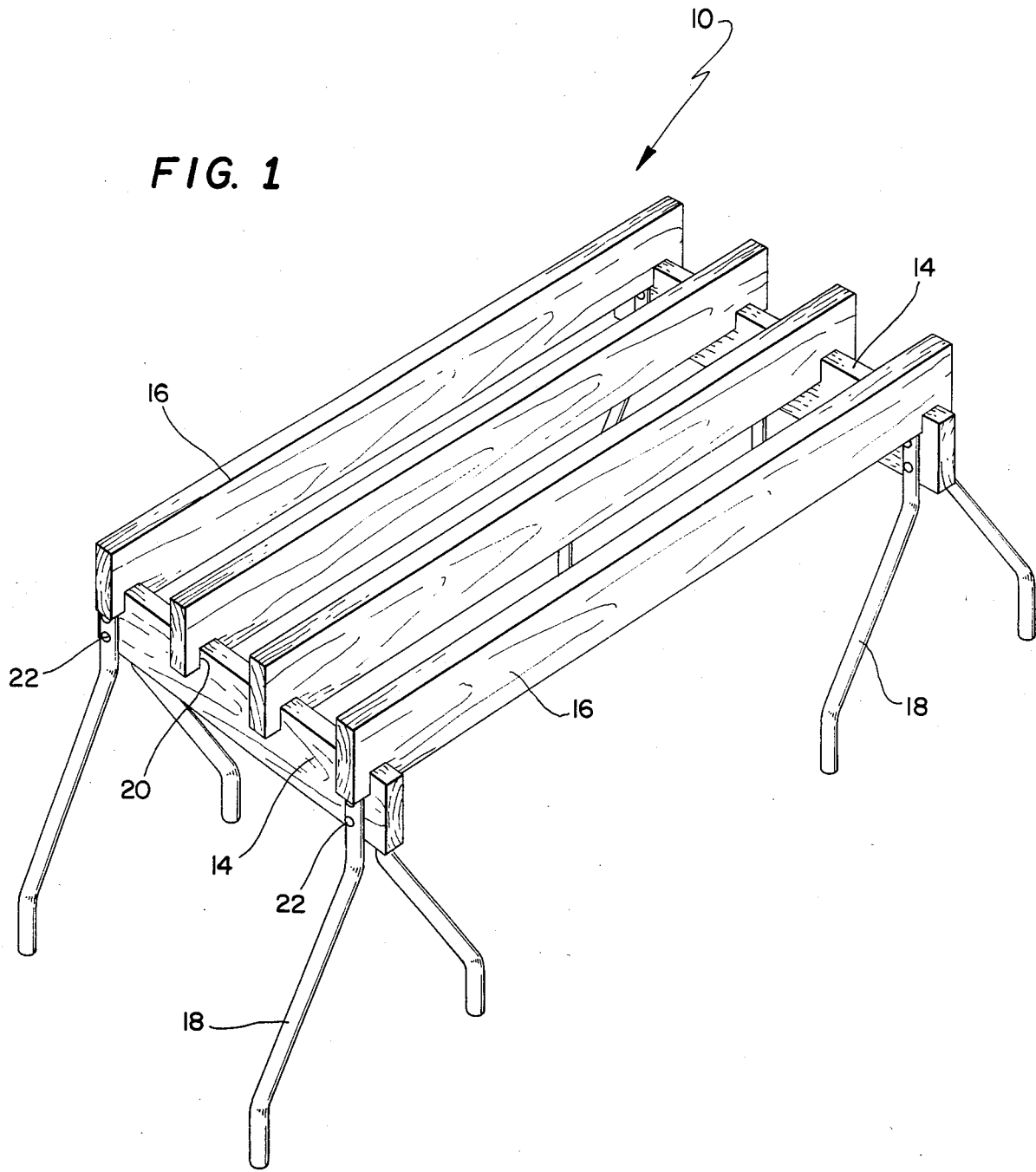
FIG. 1 is a perspective view of a basic unit of a workbench construction embodied in the instant invention.

Referring now to the drawings, a basic embodiment of the workbench construction of the instant invention is illustrated in FIG. 1 and is generally indicated at 10. A fully assembled embodiment of the basic workbench construction which includes the workbench unit 10 plus several additional elements is illustrated and is generally indicated at 12 in FIGS. 2 and 3. The basic workbench unit 10 comprises a pair of spaced bench beams 14, a plurality of spaced longitudinal lower main rails 16 being received in interfitting relation on the bench beams 14 wherein the upper surfaces of the rails 16 are substantially coplanar. A plurality of legs 18 are attached to the bench beams 14 for supporting the bench beams 14 in upwardly spaced relation on a supporting surface so that the upper edges of the main rails 16 are substantially horizontal.

The bench beams 14 preferably comprise wooden boards which are rectangular in cross-sectional configurations, the bench beams 14 being positioned on edge in substantially transverse relation with respect to the main rails 16. A plurality of upwardly facing spaced notches 20 are formed in the topmost surface of each of the bench beams 14, the notches 20 being dimensioned to receive the main rails 16 in snug fitting relation.

Figure 3:
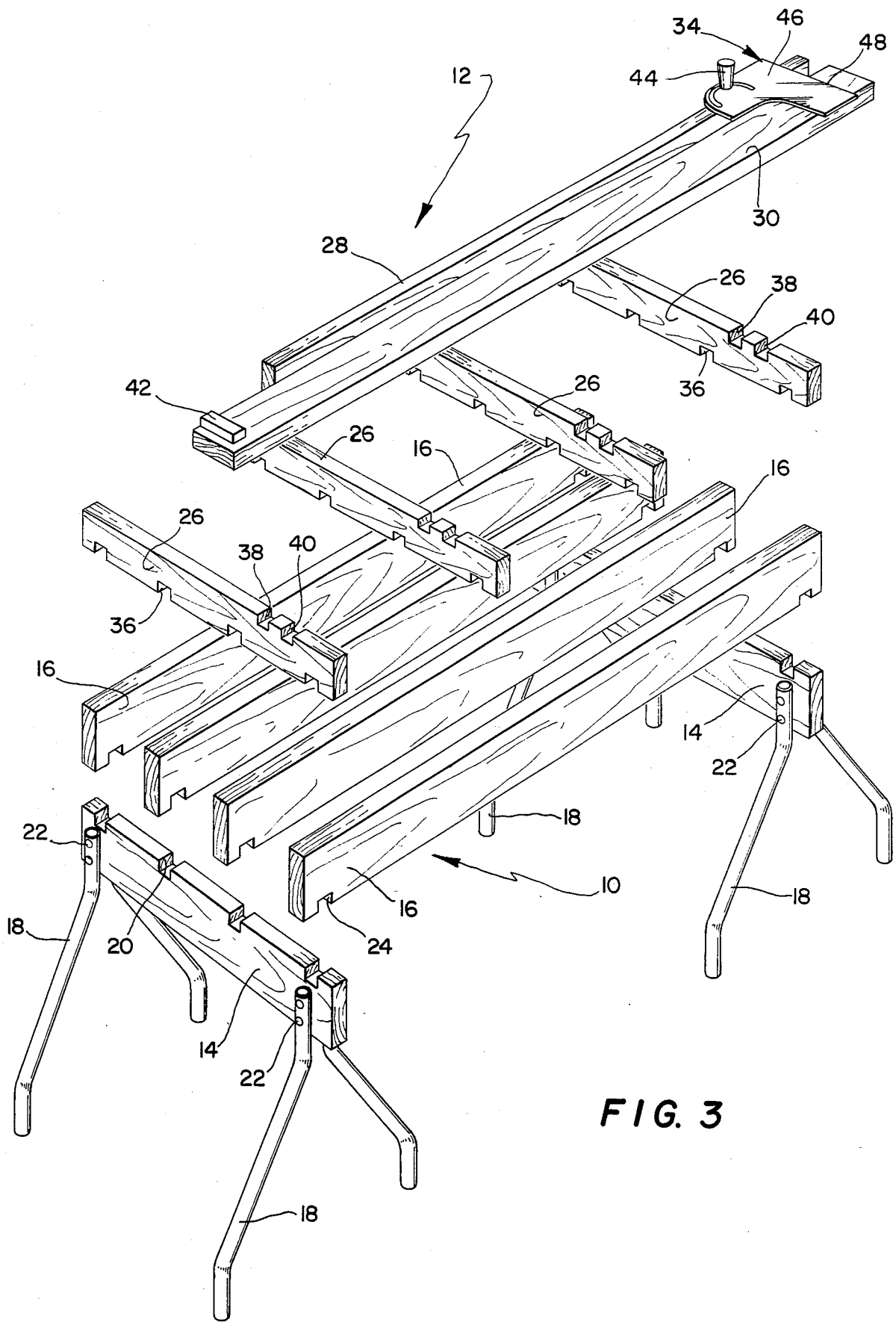
FIG. 3 is an exploded perspective view of the fully assembled embodiment of the workbench construction.

The legs 18 preferably comprise tubular members which are constructed of a rigid material such as steel, and are preferably secured to the bench beams 14 adjacent to the ends thereof by pairs of bolts 22. As shown in FIGS. 1 and 3, each pair of legs 18 as secured to a bench beam 14 by the bolts 22 effectively supports the bench beam 14 so that when one of the bolts 22 of a pair is removed, the respective legs 18 can be folded into longitudinal alignment with the beam 14.

The main rails 16 are normally defined by wooden boards which are rectangular in cross sectional configuration, and in the assembled position on the beams 14 are disposed on edge. The main rails 16 are of substantially greater length than the bench beams 14 and are formed with downwardly facing notches 24 on the bottom edges and adjacent to the opposite ends thereof. The notches 24 are dimensioned and located for receiving the bench beams 14 in snug fitting relation therein, and as shown, the main rails 16 are mounted on the bench beams 14 with the notches 24 being received in interfitting relation in the notches 20. Thus, when the rails are received in interfitting relation on the bench beams 14 in this manner, the upper edges thereof are preferably substantially coplanar, and when the lower ends of the legs 18 are positioned on a substantially horizontal supporting surface, the upper edges of the main rails 16 are also substantially horizontal.

Figure 2:
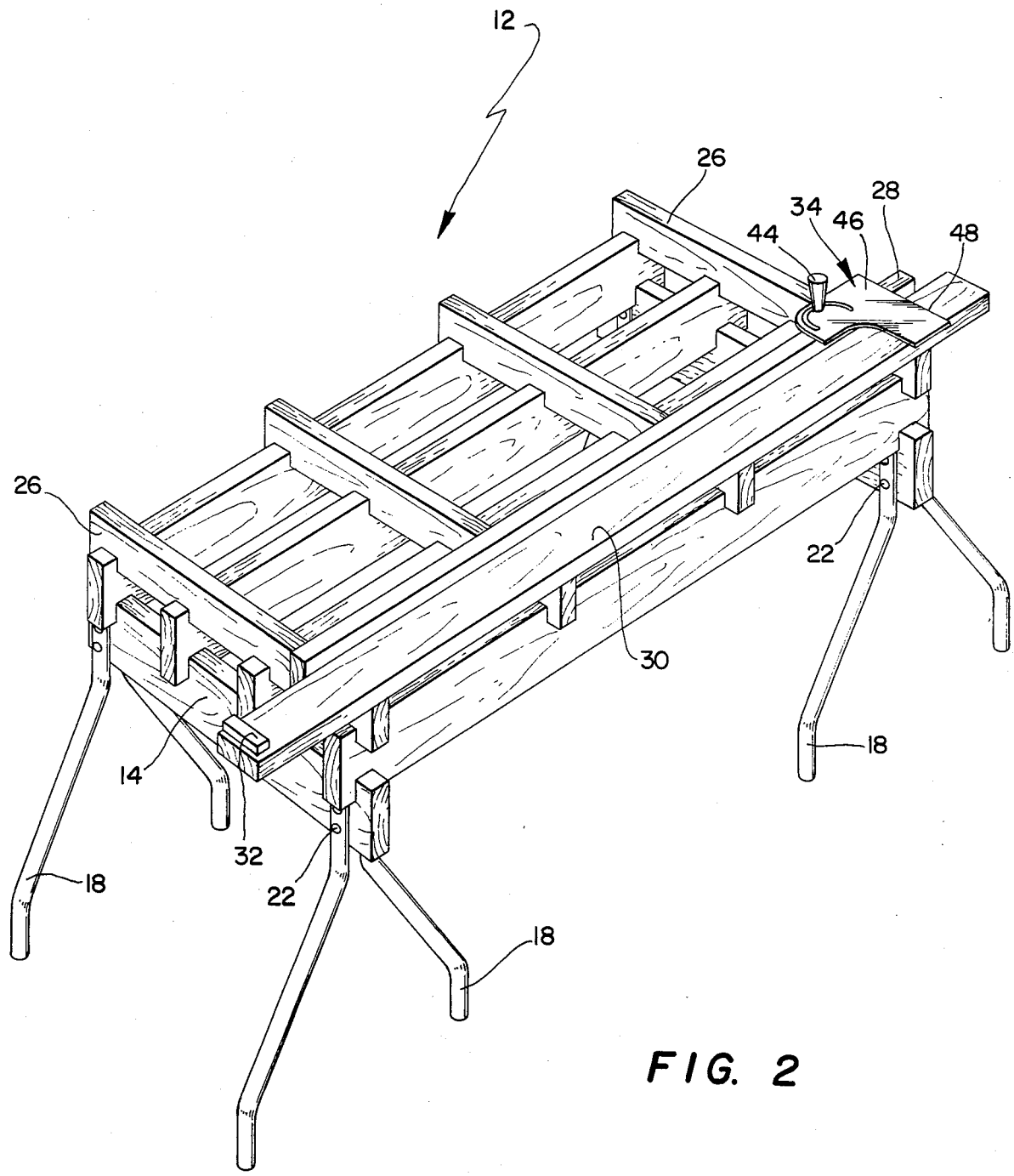
FIG. 2 is a perspective view of a fully assembled embodiment thereof.

The fully assembled workbench construction 12 which is illustrated in FIGS. 2 and 3 includes the basic unit 10, a plurality of transverse upper rails 26, a fence 28, a cutoff table 30, having a stop member 42 thereon, and a mitering gauge 34. The transverse upper rails 26 are detachably received in interfitting relation on the main rails 16 and the fence 28 is detachably received in interfitting relation on the transverse upper rails 26. The cutoff table 30 is received on the transverse upper rails 26 so that it extends along the fence 28 and the mitering gauge 34 is preferably secured to the fence 28, the mitering gauge 34 being positionable so that it extends outwardly over the cutoff table 30.

The transverse upper rails 26 are also defined by wooden boards, each of which has generally rectangular cross sectional configuration, and that is disposed in perpendicular relation with respect to the main rails 16. Each of the transverse upper rails 26 is formed with a plurality of spaced downwardly facing notches 36 along the lower edges thereof which are dimensioned and oriented for receiving the main rails 16 in snug fitting relation therein. The transverse upper rails 26 are also dimensioned and configured so that when they are received on the main rails 16 in this manner and the lower ends of the legs 18 are positioned on a substantially horizontal supporting surface, the upper edges of the transverse rails 26 are in a substantially horizontal plane. Formed in the upper edges of the transverse upper rails 26 are spaced first and second upwardly facing slots 38 and 40, respectively. The slots 38 and 40 as formed in each of the transverse upper rails 26 are in general alignment with the corresponding slots in the other upper rails 26 and as so aligned are dimensioned for alternately receiving the fence 28 in relatively snug fitting relation in alternative substantially parallel first and second positions thereof. Accordingly, the fence 28 also preferably comprises an elongated wooden board which has a generally elongated cross-sectional configuration for being receivable in either of the slots 38 or the slots 40 as formed in the transverse rails 26.

The cutoff table 30 also preferably comprises an elongated wooden board which has a generally elongated cross-sectional configuration. As shown in FIG. 2, the cutoff table 30 is disposed such that the wide undersurfaces thereof engage the uppermost edges of the rails 26. In this position, the cutoff table 30 is positioned so that the inner facing edge thereof abuts the adjacent wide face of the fence 28, and in some cases it may be permanently secured to the fence 28. As shown in FIGS. 1 and 3, the stop member 32 extends substantially transversely across the upper surface of the cutoff table 30 adjacent to an end thereof. In this regard, the stop member 32 is permanently secured to the cutoff table 30, although it will be understood that other embodiments of the invention, wherein the stop member 32 is adjustably positioned at various points along the longitudinal extent of the table 30, are contemplated.

The mitering gauge 34 is also secured to the fence 28, and is positioned such that a portion thereof extends outwardly over the upper surface of the cutoff table 30. The mitering gauge 34 is of conventional construction and includes an adjustment knob 44 and a body 46 formed with a scribing edge 48. The mitering gague 34 as mounted on the fence 28 can be easily removed therefrom by unscrewing the adjustment knob 44 and thereafter lifting the body 46 from the fence.

For use and operation of the instant invention as embodied in the basic workbench unit 10, the upper edges of the rails 16 define a substantially horizontal working plane on which various members such as boards or paneling can be received. For carrying out a board sawing operation, a member which is to be cut is placed on the upper edges of the main rails 16 so that the intended saw line is aligned with one of the spaced areas between the main rails 16 in order to provide clearance for a saw blade used during the cutting operation. In this regard, by positioning the intended saw cutting line so that it is aligned with the spaced area between a pair of the rails 16 in the central portion of the bench 12, the main rails 16 on the opposite sides of the saw line provide support for both portions of the member during the sawing operation. In order to perform various other types of saw cutting operations, the additional elements included in the fully assembled workbench 12 provide certain advantages. Accordingly, in this form of the invention, the transverse upper rails 26 are mounted on the main rails 16, and for selected operations the fence 28, the cutoff table 30 and the mitering gauge 34 are also installed on the upper rails 26. For example, in order to perform saw cutting operations wherein transverse saw cuts are required on elongated members, the upper rails 26 are installed on the main rails 16, and an elongated member to be cut is placed on the upper rails 26. The spacing between the upper rails 26 provides clearance for a saw blade during the saw cutting operation, and the upper rails 26 provide support for both sections of the member as it is cut. In order to accomplish precision cutting operations, the fence 28 is utilized for aligning a member to be cut, and the cutoff table 30 provides effective support for the member during a cutting operation. Further, when a member to be cut is aligned by placing it against the fence 28, a desired cutting angle can be scribed on the member by utilizing the mitering gauge 34. Further, the stop member 32 can be employed when a series of identical cutting operations on a plurality of members to be cut are required. Specifically, by positioning each member to be cut on the table 30 so that the end thereof engages the stop member 32, the desired cutting line can be scribed on the other end by utilizing the mitering gauge 34; and thus a series of members can be identically marked and cut using this procedure. When the workbench 12 is embodied with a movable stop member 32, the workbench 12 can be adjusted to effect cutting of members to various desired lengths.

It is seen therefore that the instant invention provides an effective workbench construction which can be easily disassembled and which can nevertheless be readily adapted for use in performing various saw cutting operations. The workbench 10 can be utilized for effecting various longitudinal cutting operations on elongated sheet members, such as paneling and the like, whereas the various other elements included in the workbench 12 can be installed in order to perform various other types of saw cutting operations, including precision saw cutting. Accordingly, it is seen that the instant invention provides an effective workbench construction which has particular advantages over the heretofore available workbenches and has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A workbench construction comprising:
   a. a pair of spaced substantially parallel bench beams each having a plurality of spaced upwardly facing notches therein;
   b. a plurality of spaced longitudinally extending main rails each having a plurality of spaced downwardly facing notches therein, said main rails being detachably received in interfitting relation on said bench beams with said main rail notches received in interfitting relation in said bench beam notches, said main rails being supported by said bench beams so that the upper surfaces of said main rails are substantially coplanar with each other and spaced upwardly from the upper surfaces of said bench beams;
   c. a plurality of substantially parallel spaced transverse rails received in interfitting relation on said main rails so that the upper surfaces of said transverses rails are substantially coplanar with each other and spaced upwardly from and substantially parallel to the upper surfaces of said main rails;

d. an elongated longitudinally extending fence member detachably received in interfitting relation on said transverse rails; and
e. leg means attached to said bench beams for supporting said bench beams in upwardly spaced relation to a supporting surface with the upper surfaces of said main rails and said transverse rails in substantially horizontal planes.

2. The workbench construction of claim 1 further comprising an elongated longitudinally extending cutoff table detachably received on said transverse rails adjacent said fence member.

3. The workbench construction of claim 2 further comprising a stop member on said cutoff table.

4. A workbench construction comprising:
a. a pair of spaced substantially parallel bench beams each having a plurality of spaced upwardly facing notches therein;
b. a plurality of spaced longitudinally extending main rails each having a plurality of spaced downwardly facing notches therein, said main rails being detachably received in interfitting relation on said bench beams with said main rail notches received in interfitting relation in said bench beam notches, said main rails being supported by said bench beams so that the upper surfaces of said main rails are substantially coplanar with each other and spaced upwardly from the upper surfaces of said bench beams;
c. a plurality of substantially parallel spaced transverse rails received in interfitting relation on said main rails so that the upper surfaces of said transverse rails are substantially coplanar with each other and spaced upwardly from and substantially parallel to the upper surfaces of said main rails;
d. leg means attached to said bench beams for supporting said bench beams in upwardly spaced relation to a supporting surface with the upper surfaces of said main rails and said transverse rails in substantially horizontal planes;
e. an elongated longitudinally extending fence member detachably received in interfitting relation on said transverse rails;
f. an elongated longitudinally extending cutoff table on said transverse rails adjacent said fence member; and
g. a miter gauge secured to said fence member and positionable so that it extends over said cutoff table.

* * * * *